United States Patent [19]

Shimomura

[11] Patent Number: 5,123,083
[45] Date of Patent: Jun. 16, 1992

[54] VIDEO HARD COPY WITH SETTING PRINTING CONDITION

[75] Inventor: Shinzo Shimomura, Ise, Japan
[73] Assignee: Shinko Electric Co., Ltd., Tokyo, Japan
[21] Appl. No.: 720,876
[22] Filed: Jun. 25, 1991
[30] Foreign Application Priority Data Jun. 27, 1990 [JP] Japan .................... 2-166654

[51] Int. Cl.⁵ ........................... G0KG 15/00
[52] U.S. Cl. .................... 395/106; 395/109; 358/80
[58] Field of Search ............ 395/106, 101, 114, 109; 358/75, 76, 80, 909, 335, 335, 244; 346/154

[56] References Cited

U.S. PATENT DOCUMENTS 4,485,413 11/1984 Furuta et al. .................. 358/75
4,780,756 10/1988 Shiota et al. .................. 358/75

Primary Examiner—Arthur G. Evans
Attorney, Agent, or Firm—Flynn, Thiel, Boutell & Tanis,

[57] ABSTRACT

In a video hard copy device having an input interface for receiving video signals be supplied to a display and converting the video signals to digital data, an image memory for receiving the digital data from the input interface and storing the image data therein, a color assigning circuit for reading the digital data and a printing portion for receiving the digital data and printing out the digital data characterized in that the video hard copy device can convert a color of a picture on the display into an arbitrary selected color by specifying a position of the image on the picture having the same color and print out the selected color and print out a geographic information image for dividing the image of one picture on the display into a plurality of matrices for setting a printing condition with use of the printed geographic information without resorting to thee picture on the display.

11 Claims, 8 Drawing Sheets

VIDEO HARD COPY WITH SETTING PRINTING CONDITION

BACKGROUND OF THE INVENTION

1. Field of the Invention

The present invention relates to a video hard copy device and a method of setting printing condition thereof for fetching video signals supplied from a host computer to a dislay such as a cathode ray tube and printing out an image or characters as appeared in the display on a printing paper.

2. Description of the Related Art

A conventional video hard copy device will be described with reference to FIG. 8.

A conventional video hard copy device comprises an input interface 21 interposed between a host computer HCPU and a display such as a cathode ray tube (hereinafer referred to as CRT) for receiving color video signals and converting them into digital image data having respectively a weight of 8 bits, an image memory 22 connected to the input interface 21 for receiving the digital image data, a printing portion 25 composed of an RGB/YMC color converting circuit 23 for receiving each picture of digital image data and a printing head 24, a printing control circuit 26 having a microcomputer therein and connected to the input interface 21 and the printing head 24 for receiving and supplying data and to the image memory 22 and the RGB/YMC color converting circuit 23 for supplying data thereto and input device 27 connected to the printing control circuit 26.

The input interface 21 fetches a red video input signal R, a green video input signal G and a blue video input signal B respectively for use in one frame among those supplied from the host computer HCPU to the display CRT and converting these color video input signals R, G and B into a red digital data $R_D$, a green digital data $G_D$ and a blue digital data $B_D$ for use in one frame. The image memory 22 having frame memories 22R, 22G and 22B receives these color digital data $R_D$, $G_D$ and $B_D$ and sets these color digital data in the frame memories 22R, 22G and 22B. After completion of storage of these color digital data in the image memory 22, these color digital data are successively supplied to the RGB/YMC color converting circuit 23 where these color digital data are converted into color data for printing. The printing head 24 receives the color data from the RGB/YMC color converting circuit 23 and prints out the color data on a printing medium.

The arrangement will be described more in detail.

When a certain color of a part of the image as appeared on the display is replaced by another color and printed out on the printing paper by the printing portion 25, it is possible to convert one of the basic eight colors, i.e. white (W), red (R), green (G), blue (B), cyan (C), magenta (M), yellow (Y), black (Bk) as the color of the part of the image into another color among the basic eight colors by specifying a numerical value but it is impossible to convert an arbitrary color of the image as appeared on the display, particularly neutral tints, into another arbitrary color and print out such color on the printing paper.

There was a problem that a compound color of the image other than the specified color appeared on the display is converted into another compound color if the former contains any of basic eight colors which is specified to be converted. That is, there was a problem that a background color of the picture on the display, e. g. a bright gray background color of the picture on the display is printed out as a dark gray background color, when black (Bk) is specified to be replaced by white (W) and white (W) is specified to be replaced by black (Bk) in order to convert black letters alone in the picture on the display into white letters.

SUMMARY OF THE INVENTION

It is therefore a first object of the present invention to provide a video hard copy device capable of converting a certain color of a picture on a display into a predetermined arbitrary selected color without converting other colors by simply specifying position of the part of the image having such color and of printing such converted color on a paper.

Assuming that an image is appeared on the display CRT in FIG. 7, when a part of the image in a rectangular area denoted at P which is not an entire image is to be printed out on the printing paper, a cross hair line cursor 30 is moved to specify points P1 and P2. When the points P1 and P2 are specified, the printing control circuit 26 issues a command to the input interface 21 for fetching the color video signal in the rectangular area P. A neumerical data and the like are supplied to the printing control circuit 26 by operating a ten key of the input device 27 along a guidance 31 as appeared on the display.

According to the video signal input condition such as the part of the area and the numerical data to be printed out, the operator moves the cross hair line cursor 30 on the display CRT or operates the input device for supplying the numerical data along the guidance on the dislay CRT so that the color video signal is once displayed on the display CRT. However, there was a problem that an extra circuit for indicating the guidance on the display CRT is prepared in conformity with a video signal specification since the video signal specification in the video terminal is not always uniform. Furthermore, there was another problem that the conventional method of setting printing condition of the video signal for printing out the image while monitoring the image on the display CRT is impractical in a system where one video hard copy is connected to a plurality of video terminals by way of a switching device. Furthermore, it was very difficult for an operator to specify the printing area by the numerical value representing vertical synchronous signals and pixels, in case that a vertical position of the image is expressed by the number of horizontal sync signals and a horizontal position of the image is expressed by the number of pixels appeared on the video terminal on the basis of pulse chips of the vertical sync signal and the horizontal sync signal.

Still furthermore, the same problem occurred when the entire tone of the printed image or the strength or the color of a part of the printed image is changed to a selected tone or strength.

It is a second object of the present invention to provide a method of setting printing condition of the video hard copy device capable of setting the printing condition without resorting to the display.

DESCRIPTION OF THE PREFERRED EMBODIMENT

A video hard copy device according to a preferred embodiment of the present invention will be described with reference to FIGS. 1 to 6.

Figure 2:
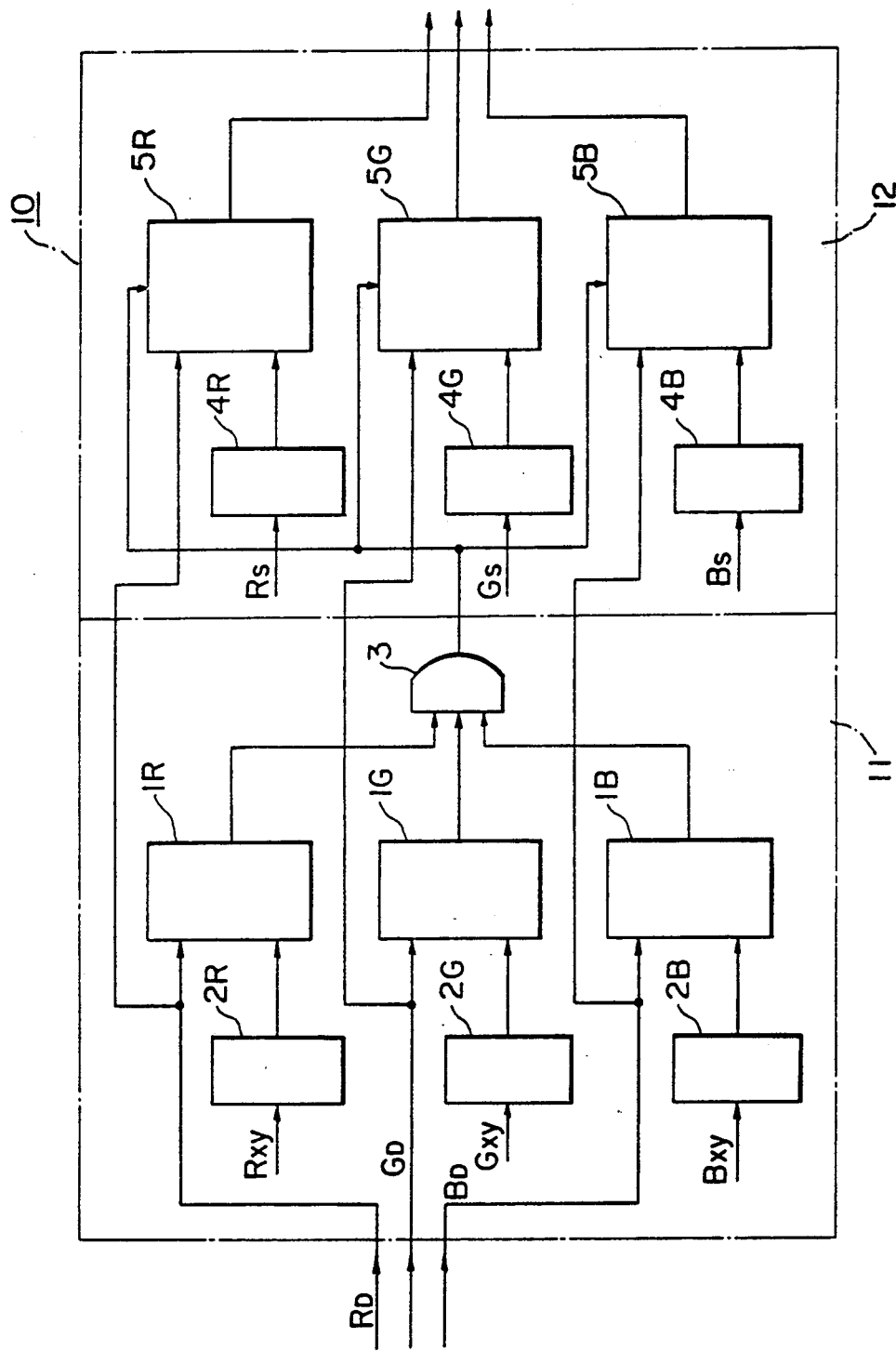
FIG. 2 is a block diagram showing a color assigning circuit in FIG. 1.
Figure 4:
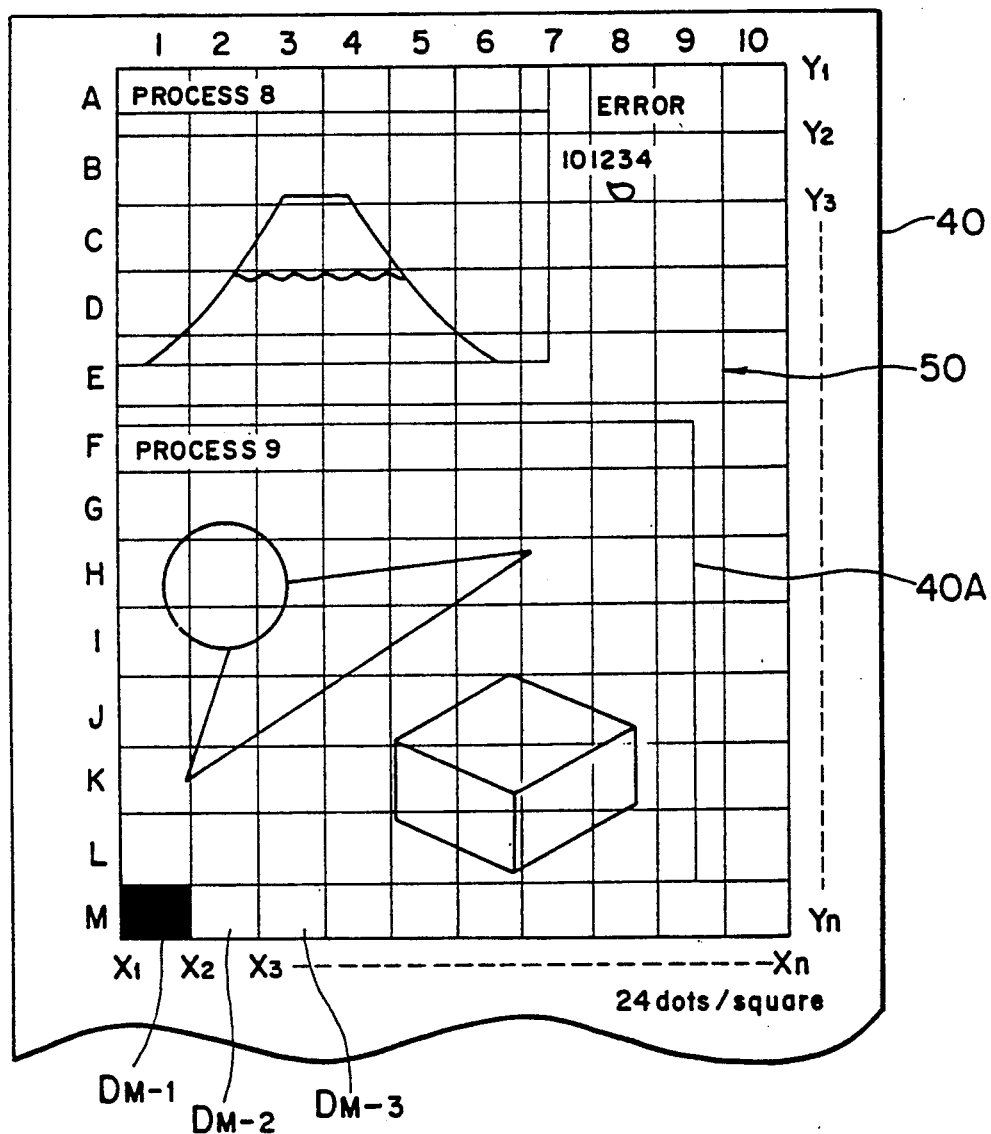
FIG. 4 is a view showing a printed image prepared by the video hard copy device in FIG. 1.
Figure 8:
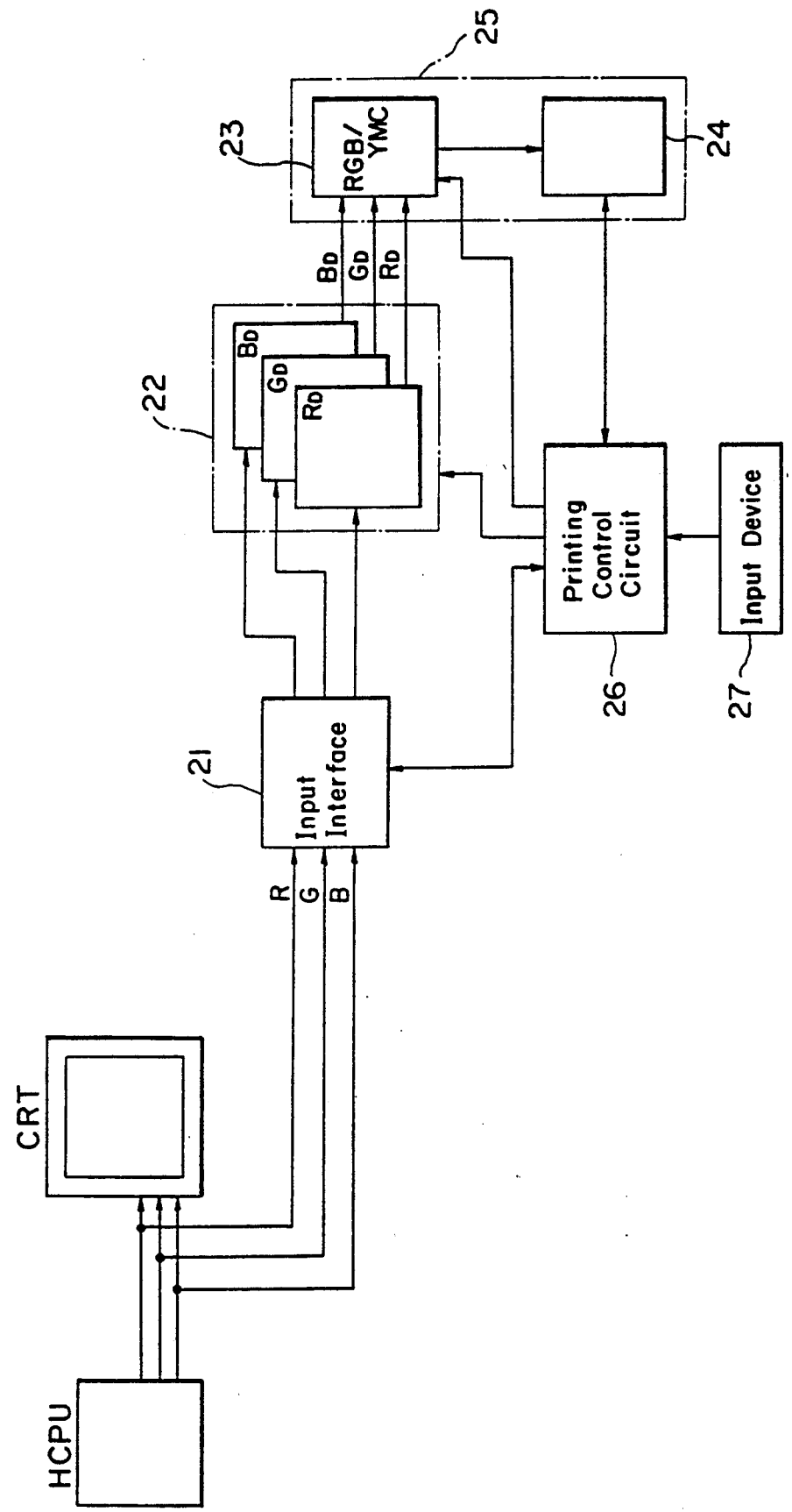
FIG. 8 is a block diagram showing an arrangement of a conventional video hard copy device.

An arrangement of the hard copy device is substantially same as that of the conventional one as illustrated in FIG. 8 except color assigning circuits as illustrated in FIGS. 2 and 4. Accordingly, the elements same as those of the conventional elements are denoted at the same numerals and the explanation thereof is omitted.

Figure 1:
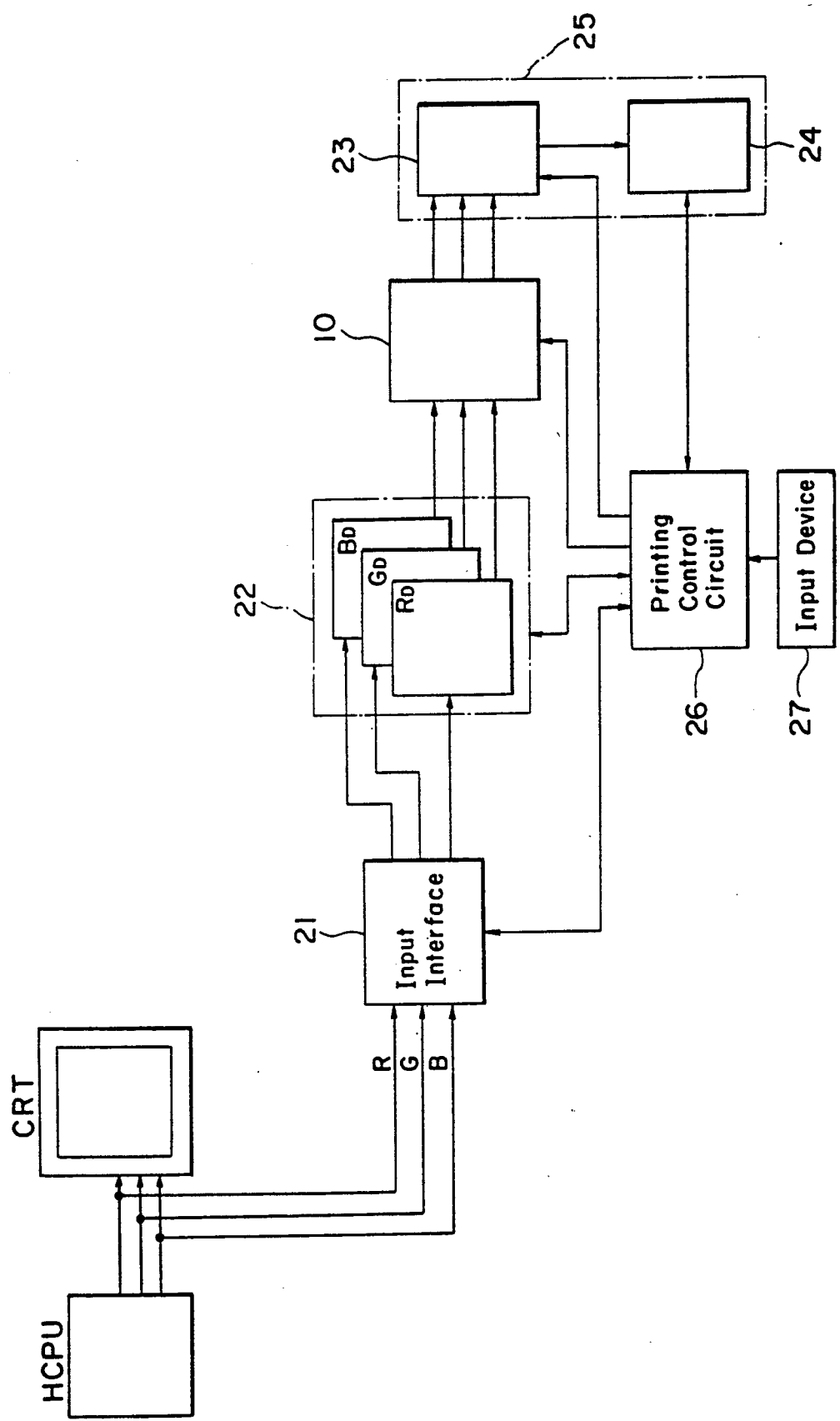
FIG. 1 is a block diagram showing an arrangement of a video hard copy device according to a preferred embodiment of the present invention.
Figure 3:
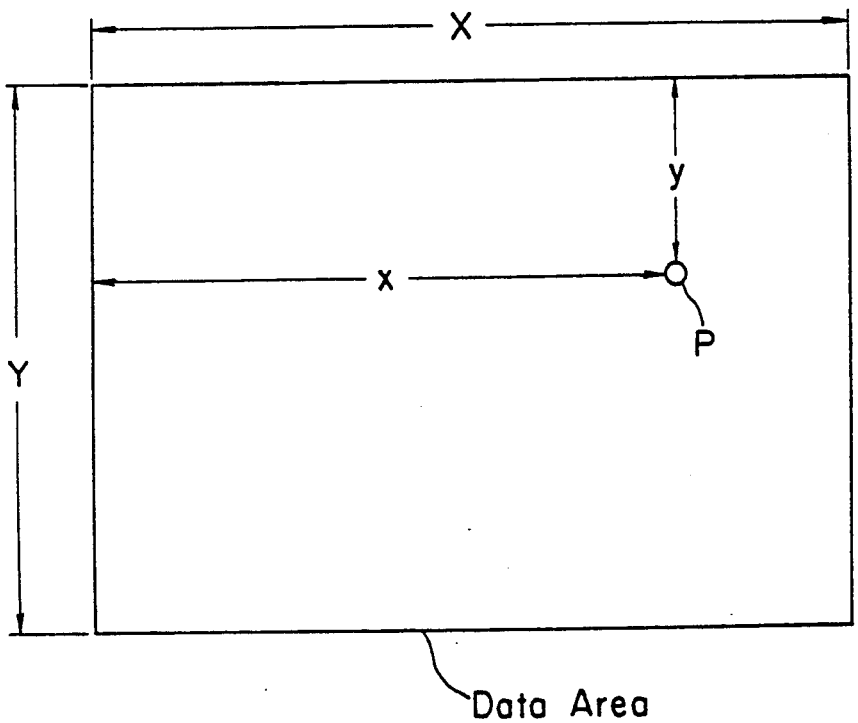
FIG. 3 is a view showing a data area in an image memory in FIG. 1.

First Embodiment
(FIG. 1 to 3)

A video hard copy device and a method of setting a printing condition according to a first embodiment of the present invention will be described with reference to FIGS. 1 to 3.

A color assigning circuit 10 is interposed between the image memory 22 and the printing portion 25. The color assigning circuit 10 will be described more in detail with reference to FIG. 2.

The color assigning circuit 10 comprises a converted red data memory 2R for storing data $R_{xy}$, a converted green data memory 2G for storing data $G_{xy}$, a converted blue data memory 2B for storing data $B_{xy}$, a discriminator 1R for receiving the red signal digital data $R_D$ and the data $R_{xy}$ and issuing a coincidence signal when the red signal digital data $R_D$ and the data $R_{xy}$ coincide with each other, a discriminator 1G for receiving the green signal digital data $G_D$ and the data $G_{xy}$ and issuing a coincidence signal when the green signal digital data $G_D$ and the data $G_{xy}$ coincide with each other and a discriminator 1B for receiving the blue signal digital data $B_D$ and the data $B_{xy}$ and issuing a coincidence signal when the blue signal digital data $B_D$ and the data $B_{xy}$ coincide with each other. An AND circuit 3 receives the coincidence signals from the discriminators 1R, 1G and 1B. The discriminators 1R, 1G and 1B and the AND circuit 3 constitute a discriminating portion 11.

The video hard copy device further comprises a desired or selected (hereinafter referred to as selected) red data setting unit 4R, a selected green data setting unit 4G and a selected blue data setting unit 4B respectively composed of a 8-bit register into which red data $R_S$, green data $G_S$ and blue data $B_S$ are respectively written and selectors (multiplexers) 5R, 5G and 5B for reading out contents of the selected red setting unit 4R, the selected green setting unit 4G and the selected blue data setting unit 4B upon reception of an output signal (gate signal) from the AND circuit 3 and supplying the read contents to the RGB/YMC color converting circuit 23. When the AND circuit 3 does not issue the gate signal, the red signal digital data $R_D$, the green signal digital data $G_D$ and the blue signal digital data $B_D$ are respectively supplied to the RGB/YMC color converting circuit 23. The selected red data setting unit 4R, the selected green data setting unit 4G and the selected blue data setting unit 4B and the selectors 5R, 5G and 5B constitute a selecting portion 12 of the color assigning circuit 10.

FIG. 3 shows a data area in each of frame memories 22R to 22B of the image memory 22. The data area has a size of the width of X pixel composed of a plurality of x pixels and the length of Y pixel composed of a plurality of y pixels. A pixel P is the one having converted color (the data $R_{xy}$, $G_{xy}$ and $B_{xy}$) and a memory address (x, y) which is addressed by an input device and set in the printing control circuit 26. The selected red data $R_S$, the selected green data $G_S$ and the selected blue data $B_S$ are set in the selected red data setting unit 4R, the selected green data setting unit 4G and the selected blue data setting unit 4B through the input device 27. The specification of memory address (x, y) having the converted color and the storage of the selected color data are respectively made by specifying the color assigning mode by the input device. The horizontal and the vertical synchronous signals and other signals to be fetched from the host computer HCPU are respectively omitted to be illustrated.

The color video signals R, G and B supplied from the host computer HCPU to the display CRT are fetched by the input interface 21 and the red video input signal R, the green video input signal G and the blue video input signal B each for one picture are converted into the red signal digital data $R_D$, the green signal digital data $G_D$ and the blue signal digital data $B_D$ by the input interface 21 and set in the image memory 22. After the completion of storage of the color signal digital data $R_D$, $G_D$ and $B_D$, these data are successively read out by the printing control circuit 26. However, according to the first embodiment of the present invention, the printing control circuit 26 reads out, before reading these data if the color assigning mode is specified, the data $R_{xy}$, the data $G_{xy}$ and the data $B_{xy}$ in the pixel P from the image memory 22 and sets the data $R_{xy}$, the data $G_{xy}$ and the data $B_{xy}$ in the converted red data memory 2R, the converted green data memory 2G and the converted blue data memory 2B.

Assume that the data $R_{xy}$ has a weight of 100, $G_{xy}$ has a weight of 85 and $B_{xy}$ has a weight of 20 and the selected red data $R_S$ has a weight of 200, the selected green data $G_S$ has a weight of 220 and the selected blue data $B_S$ has a weight of 150.

The image data respectively read out by the image memory 22 are respectively supplied to the color assigning circuit 10. Assuming that image data $R_{xy'}$ of a certain pixel P' just read out has a weight of 100, data $G_{xy'}$ has a weight of 85 and data $B_{xy'}$ has a weight of 25, the discriminators 1R and 1G issue output signals since the data $R_{xy}$ equals to the data $R_{xy'}$ and the data $G_{xy}$ equals the data $G_{xy'}$ while the discriminator 1B does not issue an output signal since the data $B_{xy}$ does not equal the data $B_{xy'}$. As a result, the AND circuit 3 is not active so that the selectors 5R, 5G and 5B supply the data $R_{xy}$ having a weight of 100, the data $G_{xy}$ having a weight of 85 and the data $B_{xy}$ having a weight of 25 respectively supplied by the image memory 22 to the RGB/YMC color converting circuit 23. When the image data having the same weight as those of the image data $R_{xy}$, $G_{xy}$ and $B_{xy}$ of the pixel P is read out by the image memory 22, the discriminators 1R, 1G and 1B issue output signals since the these data conform to the contents of the converted red data memory 2R, converted green data memory 2G and converted blue data memory 2B so that the AND circuit 3 is active. Accordingly, the selectors 5R, 5G and 5B select the selected red data setting unit 4R, the selected green data setting unit 4G and the selected blue data setting unit 4B and supply the data $R_S$ having a weight of 200, the data $G_S$ having a weight of 220 and the data $B_S$ having a weight of 150 instead of the data $R_{xy'}$, the data $G_{xy'}$ and the data $B_{xy'}$ to the RGB/YMC color converting circuit 23.

According to the first embodiment of the present invention, if a certain color (converted color) of the image as appeared in the picture on the display is converted into another selected color and printed out, a certain position of the image having the converted color (an absolute position on the image memory 22) is specified and the numerical value of the selected color is specified whereby the entire color of the image having the same color as that on the certain position of the image can be converted into the selected color. The converted color and the selected color may be arbitrary color including the neutral tints.

When a background color of the picture on the display is to be converted into the selected color, the arbitrary position in the image having the background color is specified and the data of the selected color is specified so that the entire background of the image can be converted into the selected color.

The discriminators 1R, 1G and 1B according to the first embodiment discriminate the conformity and nonconformity of two input data supplied thereto. However, it is possible to unifying the entire background color of the image by the selected color.

With the arrangement of the video hard copy device and a method of setting printing condition of the video hard copy, if the discriminators monitor image value read out from the image memory 22 and discriminate that it is the same value as that of the image data to be converted in the color thereof, the selectors can select the selected color data setting units and specify the position of the image so that the entire color of the image thus specified can be converted into the selected color. As a result, it is possible to achieve the color assigning function capable of selectively converting the color of the image into the selected color.

Figure 5:
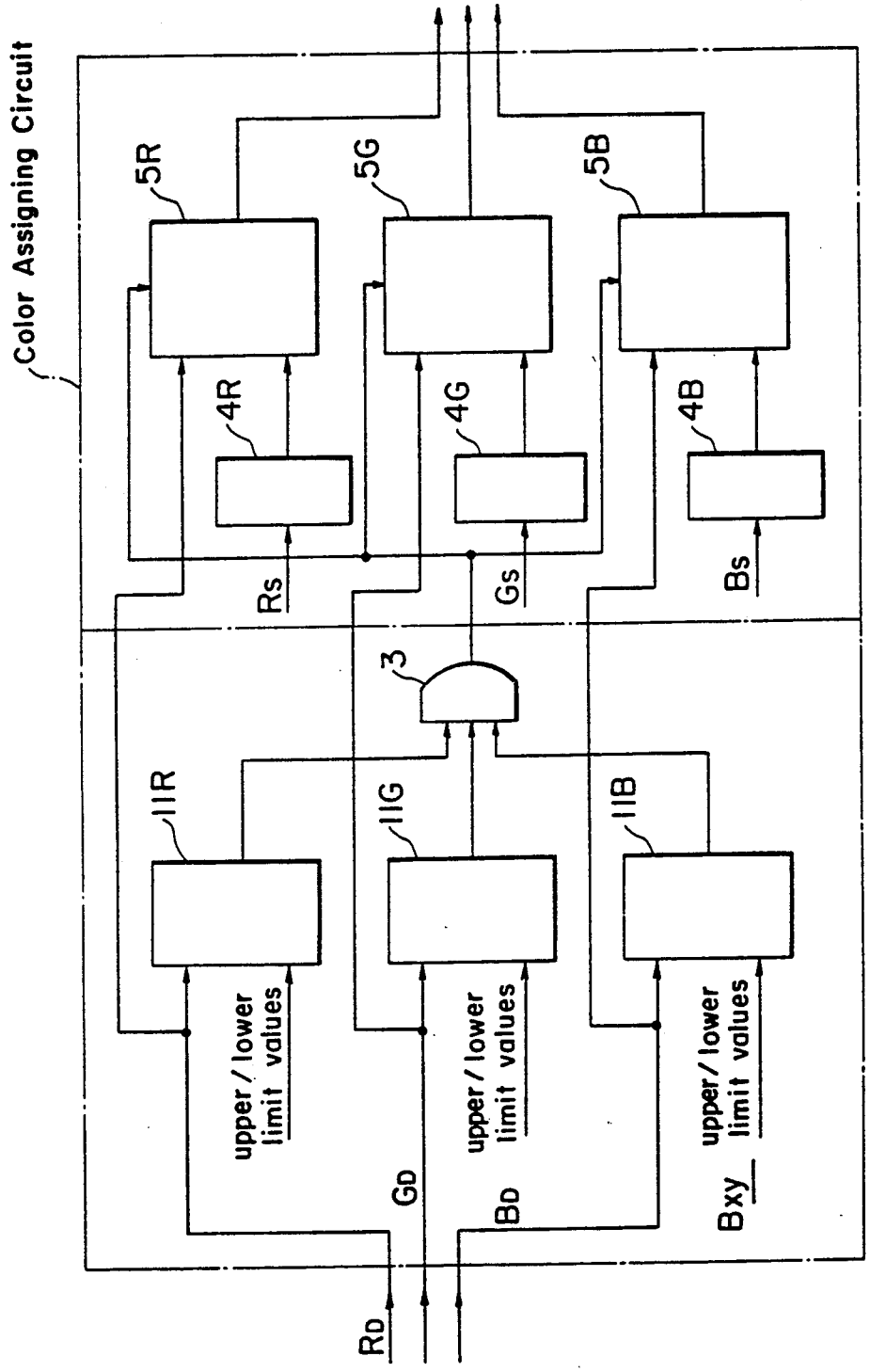
FIG. 5 is a view showing another printed image prepared by the video hard copy device of the present invention.
Figure 6:
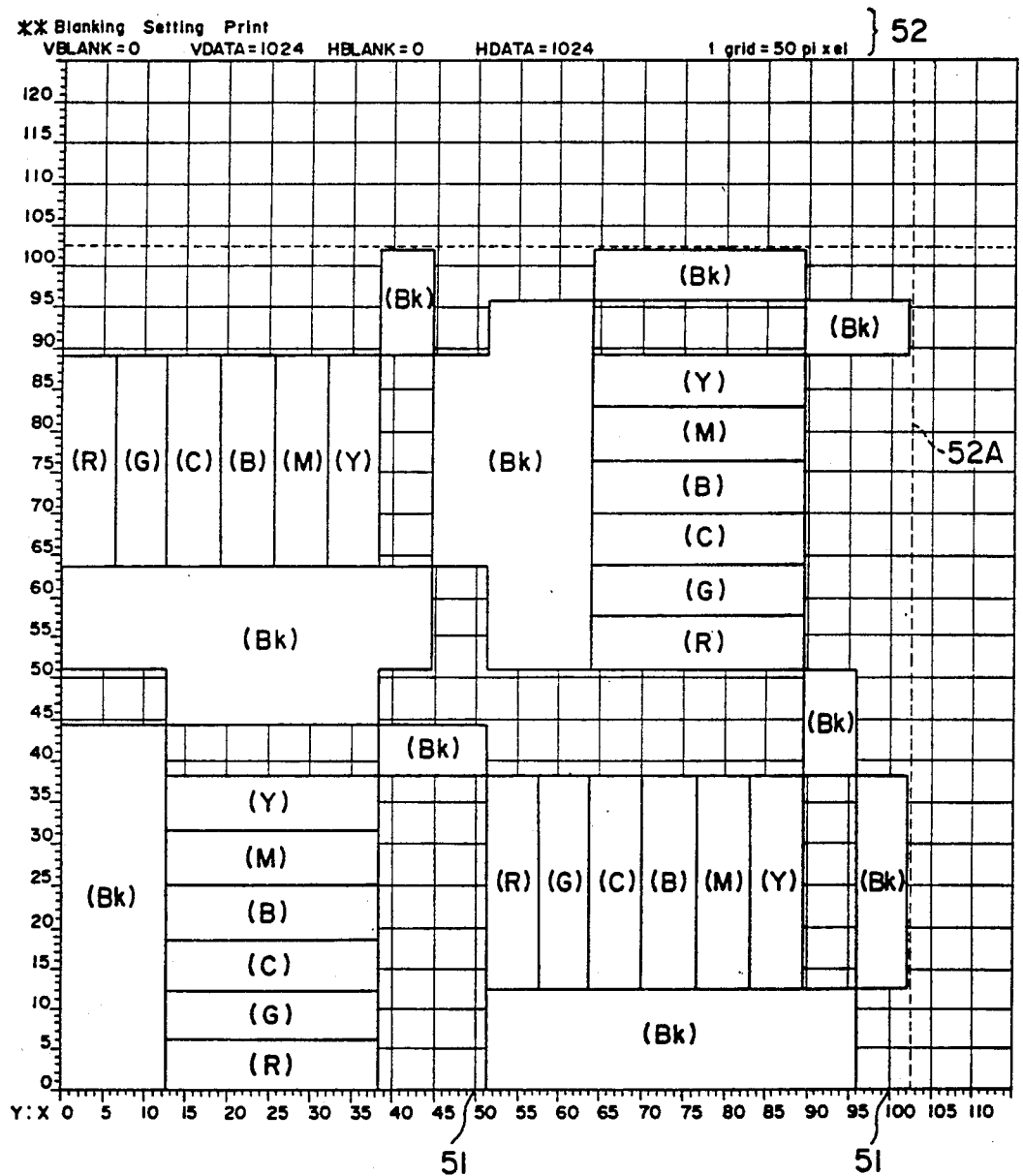
FIG. 6 is a block diagram showing another color assigning circuit of the present invention.
Figure 7:
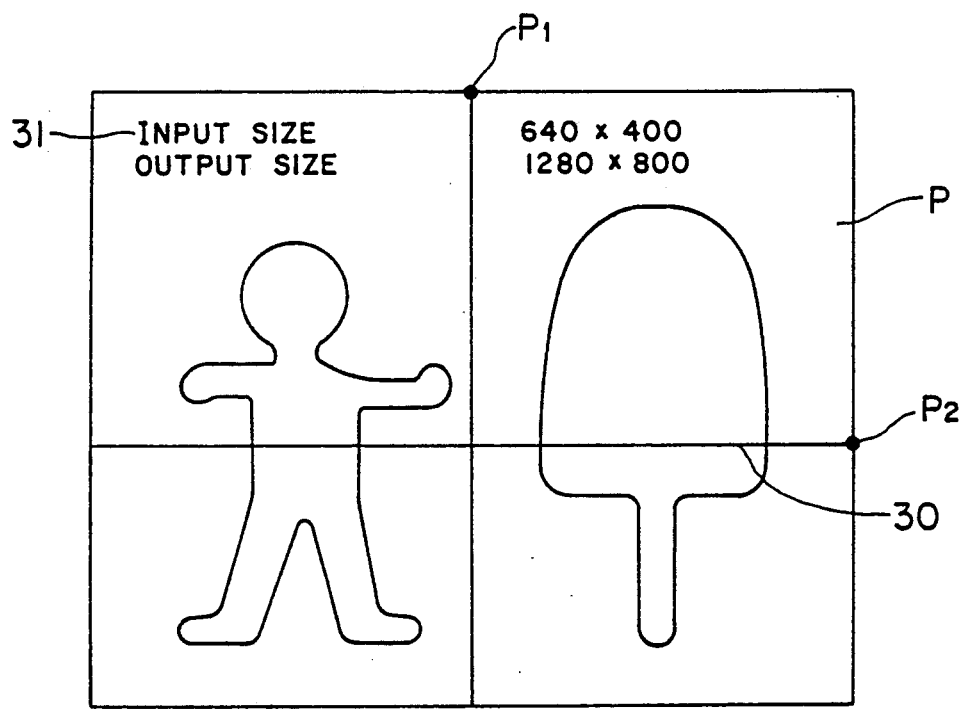
FIG. 7 is a view showing an example of a picture on a display in FIG. 1.

Second Embodiments (FIGS. 4 to 6)

A video hard copy device and a method of setting a printing condition according to a second embodiment will be described with reference to FIGS. 4 to 6.

FIG. 4 shows the image printed on a sheet 40 according to the method of the present invention. A lattice image 50 is also printed on the sheet 40 in addition to the image as appeared on the display CRT.

The lattice image 50 comprises a plurality of lateral grids $X_n$ ($X=X_1, X_2, X_3, \ldots$) and a plurality of vertical grids $Y_m$ ($Y_1, Y_2, Y_3, \ldots$). The lattice image 50 is established by specifying the number of splits each having interval of every 64 pixels or 128 pixels as indicating pixels considering resolution of the picture on the display CRT and printing resolution. Numerals 1, 2, 3 . . . and A, B, C . . . are lattice geographic information for specifying lattice segment areas and printed at margins in peripheries of the lattice image 50. The lattice image 50 has a bottom row (M-row) forming a color sample palette row where the printing color samples are arranged.

The lattice information comprising the matix image 50, the lattice geographic information and the color sample palette column information is supplied to the printing control circuit 26 by way of the input device 27 as illustrated in FIG. 1. That is, the printing control circuit 26 has such a program that if the data area size of the image memory 22 and the number of the splits of the indicating pixels are given to the printing condition circuit 26, the printing control circuit 26 performs a positional operation for the vertical grids $Y_n$ and the lateral grids $X_n$ so that the printing control circuit 26 can prepare the lattice image 50 and the lattice geographic information and supply these information to the printing portion 25 at the video signal input condition setting mode and also supply the color sample palette data to the printing portion 25 when the color sample palette data is supplied to the printing control circuit 26.

Described first is the case of specifying the image area to be printed out as one of the printing condition. If the image portion 40A alone is printed out, the operator operates the input device 27 for supplying the following information to the one control circuit 26 while monitoring the sheet 40.

LEFT CORNER :
  F-5 dots
  1-1 dots
RIGHT CORNER:
  L-24 dots
  9-12 dots

If the operator operates the input device 27 for fetching the video input signal after the supply of the information set forth above at the normal printing mode, the printing control circuit 26 receives the video signal of the image portion 40A in the rectangular area and sends the signal to the printing portion 25 so that the printing portion 25 can print out. The lattice image information is not printed out at the normal printing mode.

In case that the color in the lattice segment area B-1 is converted into another color, e.g. the color of the lattice segment area M-3 in the color sample palette column and printed out, the color in the lattice segment area B-1 is specified as the converted color and the color of the lattice segment area M-3 is specified as the selected color which are respectively supplied to the printing control circuit 26. Since the image data $D_{B-1}$ (converted color) in the lattice divisions area B-1 can be read out from the image memory 22 and the data $D_{M-3}$ (selected color) in the lattice segment area M-3 has been supplied to the printing control circuit 26 at the time of supply of the lattice information, the color conversion can be made only by specifying the lattice segment area if the image data having the same data value as the image data $D_{B-1}$ (converted color) is replaced by the data $D_{M-3}$ and printed out when the image data is read out from the image memory 22. If the lattice segment area B-1 is specified as the converted color and the lattice segment area G-7 is specified as the selected color, the image data having the same value as the image data $D_{B-1}$ in the lattice segment area B-1 can be replaced by the image data $D_{G-7}$ and printed out.

A color assigning circuit as illustrated in FIG. 5 comprises window comparators 11R, 11G and 11B which receives the red signal digital data $R_D$, the green signal digital data $G_D$ and the blue signal digital data $B_D$ from the image memory 22 and supplies these signals to the AND circuit 3 when the values of these data are within the limits of upper limit setting values and lower limit setting values. Other components of the color assigning circuit are the same as those of the color assigning circuit in FIG. 2, hence the explanation thereof is omitted.

Suppose that the red signal digital data $R_D$ in the lattice segment area equals 128, the green data $G_D$ equals 64 and the blue signal digital data $B_D$ equals 38. If the density of the color is specified to be varied in the range of 5% relative to the entire density (since the image data has a 8-bit weight, the image data has a weight of 12) for eliminating the variety of the color of the image to be converted and printed out, the printing control circuit 26 performs the operation by adding 12 to or subtracting 12 from the color data values in the lattice segment area B-1 read out from the image memory 22, i.e. the red signal digital data $R_D = 128$, the green signal digital data $G_D = 64$ and the blue signal digital data $B_D = 38$ for obtaining the upper limit value 140 and the lower limit value 116 for the red signal digital data $R_D$, the upper limit value 76 and the lower limit value 52 for the green signal digital data $G_D$ and the upper limit value 50 and the lower limit value 20 for the blue signal digital data value $B_D$. These upper and lower limit values are supplied to the window compensators 11R, 11G and 11B. If the lattice segment area M-3 is specified, the printing control circuit 26 supplies the selected color data, e.g. the selected red data $R_S = 32$, the selected green data $G_S = 65$ and the selected blue data $B_S = 60$ to the registers 4R, 4G and 4B.

In case that the color assigning circuit as illustrated in FIG. 5 is incorporated in the conventional color video hard copy as illustrated in FIG. 8, the AND gate 3 issues the gate signal if the value of the signal digital red data read out from the image memory 22 is within the limits of 140 to 116, the value of the green signal digital data is within the limits of 76 to 52 and the value of the blue signal digital data is within the limits of 50 to 26 so that the selected red data $R_S32$, the selected green data $G_S = 65$ and the selected blue data $B_S = 60$ are read out from the registers 4R, 4G and 4B and supplied to the color converting circuit 23. If only the value of the red signal digital data $R_D$ and the value of the blue signal digital data $B_D$ are within the limits set forth above but the value of the blue signal digital data $G_D$ is beyond the limits set forth above, the AND gate does not issue the gate signal so that the multiplexers 5R, 5G and $5_B$ supply the red signal digital data $R_D$, the green signal digital data $G_D$ and the blue signal digital data $B_D$ to the color converting circuit 23 as they are and do not convert these data into the selected colors.

It is a matter of course to employ the discriminators 1R, 1G and 1B as illustrated in FIG. 2 instead of the window comparators 11R, 11G and 11B. If two pairs of assigning circuits as illustrated in FIG. 5 are provided in which one circuit is exclusively used for conversion into white while the other circuit is exclusively used for conversion into black, it is possible to specify the scopes of white and black whereby complete white/black conversion can be made.

The lattice geographic information as illustrated in FIG. 4 specifies the lattice segment area by numbers 1, 2, 3 . . . , A, B, C . . . However, the lattice segment area can be specified by a graph paper information as illustrated in FIG. 6.

The graph paper information comprises a plurality of squares respectively spaced in given pixels (e.g. 50 pixels), an additional cursor 51 spaced in every 10-pixels, present printing condition (scope) data 52 printed outside the frame and an additional line 52A for specifying the present printing scope.

The color in the graph paper information comprises basic eight colors, i.e. white (W), red (R), green (G), blue (B), cyan (C), magenta (M), yellow (Y) and black (Bk). While (W) is omitted to be denoted.

According to the graph paper information, compared with the lattice geographic information as illustrated in FIG. 4, it is possible to specify the printing scope more in detail and with more precision. The operator can specify the scope of the color image necessary for fetching with use of the present printing condition (scope) data 52 and the additional line 52A so that the scope for fetching the color image can be specified with accuracy and assurance.

With the arrangement of the video hard copy device according to the second embodiment, it is possible to input and set the video signal fetching condition into the color assigning circuit without resorting to the picture as appeared on the display since the video signal input condition can be set while monitoring the resultant printed out data. Accordingly, an extra device matching with the specification of the video signal is not required.

Furthermore, it is possible to set the printing condition with ease and accuracy since such setting can be made while monitoring the actually printed out image.

It is also possible to replace color assigning circuits as illustrated in FIGS. 2 and 5 by software.

What is claimed is:

1. A video hard-copy device comprising an input interface for fetching color video signals supplied from a host computer to a display and converting the color video signals into image data, an image memory connected to the input interface for receiving the image data from the input interface and storing the same data therein, a color assigning circuit connected to the image memory for reading the image data and a printing portion for receiving the image data and printing out the image data, characterized in that the color assigning circuit comprises:

a discriminating portion for discriminating that the read image data conforms to an image data in a specified memory address having a converted color from which a certain color of one of the image data is converted and issuing an output signal when they conform to each other; and a selecting portion for supplying the image data to the printing portion when the discriminating portion does not issue the output signal and supplying the selected color data instead of the image data to the printing portion when the discriminating portion issues the output signal.

2. A video hard copy device according to claim 1, wherein the discriminating portion comprises a first discriminator for receiving red signal digital data and comparing the same data with a content of a data register of a red portion to be converted and issuing coincidence signal when the same data coincides with the content of the data register of a red portion to be converted, a second discriminator for receiving green signal digital data and comparing the same data with a content of a data register of a green portion to be converted and issuing coincidence signal when the same data coincides with the content of the data register of a green portion to be converted, a third discriminator for receiving blue signal digital data and comparing the same data with a content of a data register of a blue portion to be converted and issuing coincidence signal when the same data coincides with the content of the data register of a blue portion to be converted;

an AND circuit for producing a gate signal upon reception of coincidence signals from the first to third discriminators; and the selecting portion comprises a first selector for supplying a content of a selected red data setting unit to the printing portion when the AND circuit produces the gate signal, a second selector for supplying a content of a selected green data setting unit to the printing portion when the AND circuit produces the gate signal and a third selector for supplying a content of a selected blue data setting unit to the printing portion when the AND circuit produces the gate signal.

3. A video hard copy device according to claim 2, wherein the first to third discriminators respectively comprise window comparators and provide outputs when the red signal digital data supplied to the first comparator is within the limits of upper and lower limit values set therein, when the green signal digital data supplied to the second comparator is within the limits of upper and lower limit values set therein, and when the blue signal digital data supplied to the third comparator is within the limits of upper and lower limit values set therein.

4. A video hard copy device according to claim 1, wherein the color assigning circuit can be substituted by a color assigning program comprising the steps of reading the image data set in a memory address of the image memory specified by way of the input device, supplying the image data to the discriminating portion and the selected data specified by way of the input device to the selecting portion, the program being executed when one of color assigning modes is selected by the input device.

5. A method of setting a printing condition of a video hard copy comprising the steps of:

(a) fetching color video signals supplied from a host computer to a display by an input interface;
(b) converting the color video signals into color digital data by the input interface;
(c) storing the color digital data into an image memory;
(d) reading the color digital data from the image memory and supplying the thus read color digital data to a printing portion having a printing head therein;
(e) driving a printing head of the printing portion;
(f) inputting a lattice information for dividing an image of one picture appeared on the display into a plurality of matrices;
(g) overlaying the lattice image or information on the image on the picture;
(h) printing out the lattice image and the digital image on the picture; and
(i) setting a printing condition based on the printed out lattice information.

6. A method according to claim 5, wherein the printed out lattice information includes a geographic information capable of specifying lattice segment area.

7. A method according to claim 6, wherein the printed out lattice information comprises a square graph information having a plurality of squares spaced at given pixels and additional cursor having the number of one/given pixels as unit.

8. A method according to claim 7, wherein the printed out lattice information has data specifying the printing area and an additional line for specifying the present printing area.

9. A method according to claim 5, wherein the printed out lattice information includes palette column wherein a plurality of printing samples are arranged.

10. A method according to claim 5, wherein the specification of the image to be printed out is made by specifying two geographic information of the lattice segment area.

11. A method according to claim 5, wherein the color conversion specification is made by specifying the geographic information of the lattice segment area where the color is to be converted and the lattice segment area having the selected color sample or other geographic information of the lattice segment area.

* * * * *